US012675339B2

(12) United States Patent
Varadan et al.

(10) Patent No.: US 12,675,339 B2
(45) Date of Patent: Jul. 7, 2026

(54) WORKLOAD MEASURES BASED ON ACCESS LOCALITY

(71) Applicant: HEWLETT PACKARD ENTERPRISE DEVELOPMENT LP, Houston, TX (US)

(72) Inventors: Srikant Varadan, San Jose, CA (US); Alex Veprinsky, San Jose, CA (US); Anirudha Kumar, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 967 days.

(21) Appl. No.: 17/658,728

(22) Filed: Apr. 11, 2022

(65) Prior Publication Data

US 2023/0325257 A1 Oct. 12, 2023

(51) Int. Cl.
| | |
|---|---|
| *G06F 3/00* | (2006.01) |
| *G06F 3/06* | (2006.01) |
| *G06F 9/50* | (2006.01) |

(52) U.S. Cl.
CPC .......... *G06F 9/5083* (2013.01); *G06F 3/0604* (2013.01); *G06F 3/0635* (2013.01); *G06F 3/067* (2013.01); *G06F 9/5016* (2013.01); *G06F 9/5044* (2013.01)

(58) Field of Classification Search
CPC ........................................................ G06F 9/48
See application file for complete search history.

(56) References Cited

U.S. PATENT DOCUMENTS

| | | | |
|---|---|---|---|
| 9,336,141 B2 | 5/2016 | Waldspurger et al. | |
| 9,405,686 B2 | 8/2016 | Waldspurger et al. | |
| 9,418,020 B2 | 8/2016 | Waldspurger et al. | |
| 9,720,835 B1 * | 8/2017 | Shilane ................. | G06F 12/126 |
| 9,898,409 B2 | 2/2018 | Sethia et al. | |
| 9,921,963 B1 * | 3/2018 | Li ......................... | G06F 12/127 |
| 10,152,339 B1 | 12/2018 | Dong et al. | |
| 10,540,202 B1 * | 1/2020 | Smaldone ............. | G06F 9/5027 |
| 10,587,527 B1 * | 3/2020 | Paulzagade ......... | H04L 41/0896 |
| 2007/0198750 A1 * | 8/2007 | Moilanen .............. | G06F 9/5083 |
| | | | 710/6 |

(Continued)

FOREIGN PATENT DOCUMENTS

| | | |
|---|---|---|
| WO | 2015/200771 A1 | 12/2015 |
| WO | 2020/252142 A1 | 12/2020 |

OTHER PUBLICATIONS

Ajay Gulati, Modeling Workloads and Devices for IO Load Balancing in Virtualized Environments. (Year: 2010).*
Ajay Gulati, Modeling Workloads and Devices for IO Load Balancing in Virtualized Environment. (Year: 2010).*

(Continued)

*Primary Examiner* — Lechi Truong
(74) *Attorney, Agent, or Firm* — Trop, Pruner & Hu, P.C.

(57) ABSTRACT

In some examples, a system samples a subset of input/output (I/O) accesses of a storage, the I/O accesses being part of a workload. The system determines, based on the sampled subset of the I/O accesses, a first reuse distance distribution for a first time interval, determines a similarity measure representing a similarity of the first reuse distance distribution and a second reuse distance distribution for a second time interval different from the first time interval, and based on a change in the similarity measure, triggers a workload placement process to determine a placement of the workload on a compute node of a plurality of compute nodes.

18 Claims, 5 Drawing Sheets

(56) References Cited

U.S. PATENT DOCUMENTS

| | | | | |
|---|---|---|---|---|
| 2008/0079734 | A1* | 4/2008 | Shearer | G06T 15/06 |
| | | | | 345/505 |
| 2012/0089654 | A1* | 4/2012 | Schweid | G06F 1/03 |
| | | | | 708/204 |
| 2013/0254324 | A1* | 9/2013 | Kramnik | H04L 43/04 |
| | | | | 709/213 |
| 2015/0010143 | A1* | 1/2015 | Yang | G06F 3/068 |
| | | | | 380/28 |
| 2015/0106578 | A1 | 4/2015 | Warfield et al. | |
| 2016/0147665 | A1* | 5/2016 | Magdon-Ismail | |
| | | | | G06F 11/3452 |
| | | | | 711/118 |
| 2016/0342890 | A1* | 11/2016 | Young | G06N 3/063 |
| 2016/0357674 | A1 | 12/2016 | Waldspurger et al. | |
| 2017/0060769 | A1 | 3/2017 | Wires et al. | |
| 2017/0139610 | A1* | 5/2017 | Choi | G06F 16/2455 |
| 2018/0103088 | A1* | 4/2018 | Blainey | H04L 67/10 |
| 2018/0300065 | A1* | 10/2018 | Talwar | G06F 12/0868 |
| 2018/0314447 | A1* | 11/2018 | Driever | G06F 12/1081 |
| 2019/0026206 | A1* | 1/2019 | Harutyunyan | G06F 11/0781 |
| 2019/0155638 | A1* | 5/2019 | Asadi | G06F 9/45558 |
| 2020/0310985 | A1 | 10/2020 | Li et al. | |
| 2023/0325257 | A1* | 10/2023 | Varadan | G06F 3/0604 |
| | | | | 718/105 |
| 2024/0089218 | A1* | 3/2024 | Huda | H04L 41/16 |
| 2024/0201880 | A1* | 6/2024 | Jiang | G06F 12/121 |

OTHER PUBLICATIONS

Saba Ahmadian, ECI-Cache: A High-Endurance and Cost-Efficient I/O Caching Scheme for Virtualized Platforms. (Year: 2018).*

Mattson et al., Abstract Only, Evaluation techniques for storage hierarchies, 1970 (2 pages).

Waldspurger et al., Efficient MRC Construction with Shards, Feb. 16-19, 2015 (17 pages).

Bennett et al., LRU Stack Processing, Jul. 1975 (5 pages).

Frank Olken, Lawrence Berkeley Laboratory, Physics, Computer Science & Mathematics Division, Efficient Methods for calculating the success function of fixed space replacement policies, May 1981 (29 pages).

Wikipedia, Jensen-Shannon divergence last edited on Jan. 30, 2022 (6 pages).

Hewlett Packard Enterprise, Reimagine storage provisioning: Intent-based provisioning with Data Services Cloud Console, Aug. 5, 2021 (6 pages).

Hewlett Packard Enterprise, Optimal workload placement using the AI-driven HPE InfoSight Resource Planner, Oct. 15, 2021 (12 pages).

Cao et al., "Timon: A Timestamped Event Database for Efficient Telemetry Data Processing and Analytics," Jun. 2020, In Proceedings of the 2020 ACM SIGMOD International Conference on Management of Data, pp. 739-753.

Salem et al., "Anomaly detection in network traffic using Jensen-Shannon divergence," 2012 IEEE International Conference on Communications (ICC), 2012, pp. 5200-5204, doi: 10.1109/ICC. 2012.6364602.

* cited by examiner

WORKLOAD MEASURES BASED ON ACCESS LOCALITY

BACKGROUND

Computing systems can execute workloads to perform various tasks. An example of a computing system is a storage system, which includes storage devices and compute nodes that manage the storage of data across the storage devices.

In other examples, other types of computing systems can be employed, such as computing systems to provide cloud services, web services, database services, analytical services, and so forth.

BRIEF DESCRIPTION OF THE DRAWINGS

Some implementations of the present disclosure are described with respect to the following figures.

Figure 1:
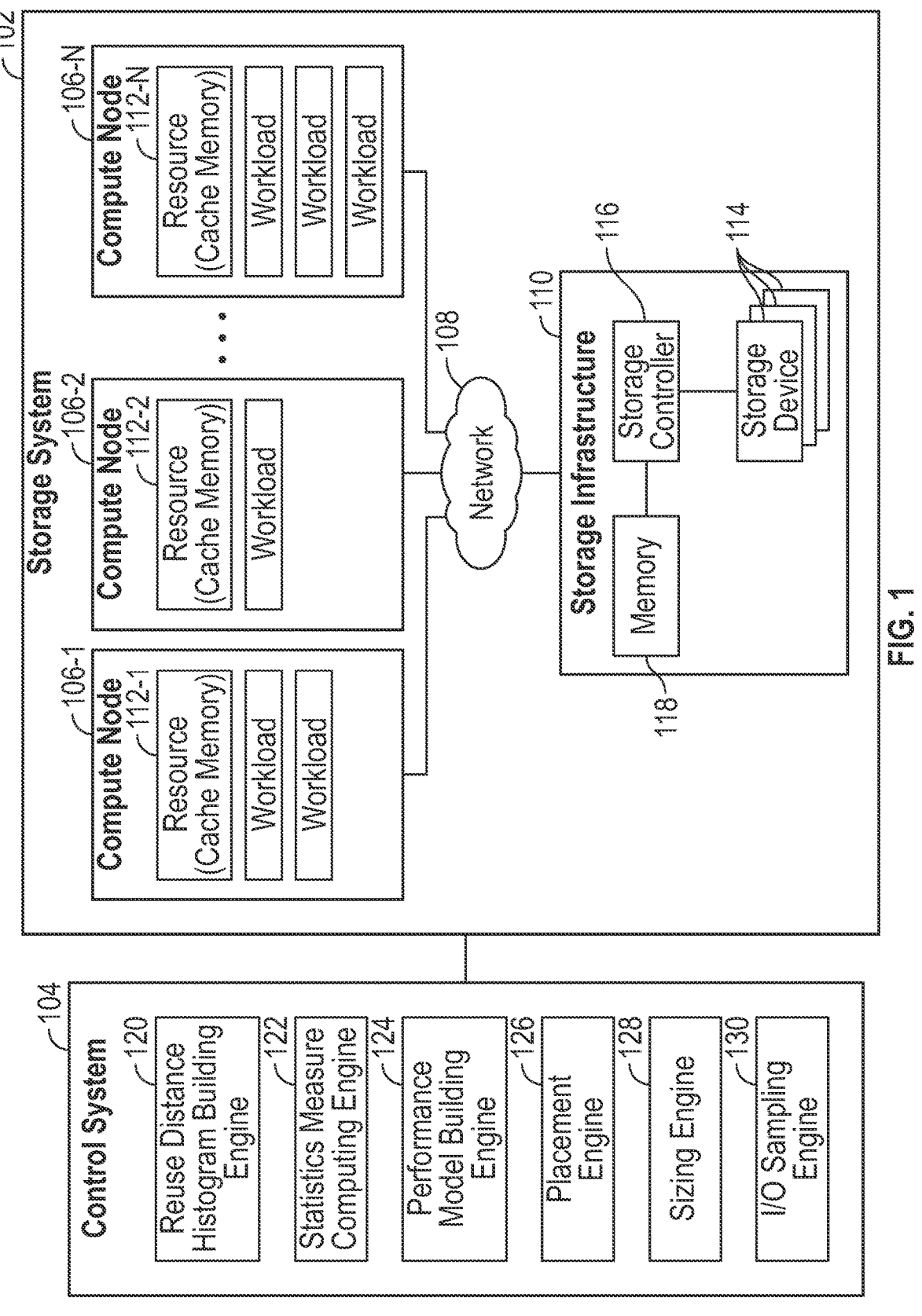
FIG. 1 is a block diagram of an arrangement that includes a storage system and a control system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, workloads can be performed on compute nodes of a storage system that has a disaggregated storage arrangement. A storage system with a disaggregated storage arrangement has a storage infrastructure that is separated from compute nodes that manage the storage of data in the storage infrastructure. Examples of workloads that can be performed by the compute nodes can include data compression, data deduplication, data encryption, data protection, and so forth.

The storage infrastructure can include a collection of storage devices (where a "collection" of storage devices can refer to a single storage device or multiple storage devices). For example, the storage infrastructure can include just a bunch of flash (JBOF) storage, which includes flash-based storage devices also referred to as solid-state drives. In other examples, the storage infrastructure can include an arrangement of disk-based storage devices, or other types of storage devices.

The storage infrastructure is connected over a network to the compute nodes of the storage system. By employing multiple compute nodes in association with the storage infrastructure, workloads can be distributed across the compute nodes for enhanced workload throughput.

Although reference is made to a storage system in which workloads associated with the storage of data are performed, in other examples, techniques or mechanisms according to some implementations of the present disclosure can be applied with other types of computing systems, such as computing systems to provide cloud services, web services, database services, analytical services, and so forth.

Demands on a computing system can be continually evolving. An administrator can initially set a configuration (e.g., quantity of compute nodes, types or quantity of processors in each compute node, cache memory size, etc.) of the computing system for expected workloads when the computing system is deployed. However, as an enterprise (e.g., a business concern, a government agency, an educational organization, etc.) evolves, the initial configuration of the computing system may no longer be satisfactory for changing workloads.

Goals of a storage system with a disaggregated storage arrangement can include maximizing resource utilization of the storage system, and minimizing the impact of resource overuse that may affect latency that is visible to requesters of workloads to be performed. To balance the foregoing goals (which may be inconsistent with one another), the storage system can perform the following actions: (1) characterize the internal load of the storage arrangement, and (2) make autonomous placement decisions when placing workloads on compute nodes of the storage system to optimize the use of available resources to satisfy the load.

Example measures for characterizing the internal load of the storage system can include consumption parameters based on consumption of processing resources, storage resources, and network resources. While such parameters can exhibit a strong correlation with load, the parameters depend on the architecture of the storage system itself, and thus do not intrinsically define a workload executed by the workload system. As an example, the same workload that consumes a larger percentage of processing or storage resources in a first storage system may consume a smaller percentage the processing or storage resources of a second storage system with greater capacities than the first storage system. Consumption parameters thus characterize how the workload consumes resources of a given storage system, and does not characterize the workload itself.

Further, example measures used for placement decisions of workloads may rely on performance parameters such as a rate of input/output (I/O) operations (e.g., I/O operations per second or IOPS) and latency (which represents a delay in performing an I/O operation in the storage arrangement). Such performance parameters are lagging indicators that allow the storage system to react after a high load event has already occurred, which may result in reduced performance or outage of the storage system due to resource overuse.

In accordance with some implementations of the present disclosure, a measure that is based on access locality (hereinafter referred to as an "access locality measure") can be used to represent an intrinsic property of a workload to be executed in a computing system, such as a storage system or another type of computing system. "Access locality" of I/O operations of a workload in a storage system can represent a distance relating to accesses of data units by the I/O operations. A "data unit" can refer to a data block, a data page, a data segment, or any other identifiable collection of data.

As an example, access locality may be represented by a reuse distance of a given data unit, where the reuse distance refers to a quantity of other intervening data units accessed between accesses of the given data unit. For example, in the data unit access sequence {A, B, C, D, A}, between accesses of the data unit A, the I/O operations of a workload accessed three other data units B, C, and D. Thus, in this example, the reuse distance for data unit A is 3. Reuse distance is an example of an access locality measure.

In other examples, a temporal distance (e.g., an amount of time) can be measured between accesses of a given data unit A, which can be used as another type of an access locality measure.

More generally, a distance relating to accesses of data units by the I/O operations can refer to how far apart in terms of accesses or time the same data unit is accessed or how far apart in terms of accesses or time different data units are accessed by the I/O operations.

In some examples, an access locality measure can be used to guide decisions on (1) optimal sizing of a computing system and (2) placement of workloads across the compute nodes of the computing system. "Sizing" a computing system can refer to setting a capacity of a resource in a compute node in the computing system, such as setting a size of a storage resource (e.g., a cache memory), setting a speed of a processor, setting a communication speed of a network resource, and so forth.

A "placement" of a workload refers to selecting a compute node(s), from among multiple candidate compute nodes, on which a workload is to be deployed and executed.

In some examples of the present disclosure, statistical techniques can be employed to detect changes in the access locality of a workload in real time. The statistical techniques can compute a statistical measure based on the access locality measure, and a variation in the statistical measure can be used to detect a change in the workload. Detecting a change in the access locality of the workload in "real time" can refer to detecting the change while the workload is actively executing in a computing system. The detected change in the access locality of the workload can be used to change a placement of the workload. In this way, the computing system can rapidly adapt to changing workloads so that performance impacts that are visible to requesters are reduced.

The use of the access locality and statistical techniques according to some examples of the present disclosure allow a computing system to anticipate or quickly detect changes in performance of workloads so that the workloads can be migrated between different compute nodes to optimize performance by reducing resource overuse.

In further examples of the present disclosure, a model that predicts performance as a function of available resources can be built based on the access locality measure. Such a model can be used in making sizing decisions for a computing system (e.g., setting the size of a cache memory in a compute node, etc.).

In the ensuing discussion, reference is made to a cache memory as being the resource in a computing system that affects performance. More generally, a resource can include another type of a storage resource, or a processing resource, or a network resource, or another type of resource.

In accordance with some examples of the present disclosure, techniques or mechanisms sample a subset of I/O accesses of a storage, where the I/O accesses are part of a workload; determine, based on the sampled subset of the I/O accesses, a first reuse distance distribution for a first time interval; determine a similarity measure representing a similarity of the first reuse distance distribution and a second reuse distance distribution for a second time interval different from the first time interval; and based on a change in the similarity measure, trigger a workload placement process to determine a placement of the workload on a compute node of a plurality of compute nodes that are able to access the storage.

FIG. 1 is a block diagram of an example arrangement that includes a storage system 102 and a control system 104 coupled to the storage system 102. The storage system 102 has a disaggregated storage arrangement that includes compute nodes 106-1, 106-2, . . . , 106-N (N≥2) that are separated from a storage infrastructure 110.

The compute nodes 106-1 to 106-N are coupled over a network 108 to the storage infrastructure 110. Examples of the network 108 can include any or some combination of the following: a local area network (LAN), a wide area network (WAN), a storage area network (SAN), a public network such as the Internet, and so forth.

Each compute node 106-1 to 106-N can execute a collection of workloads (a single workload or multiple workloads). In addition, each compute node 106-1 to 106-N includes a respective resource 112-1, 112-2, . . . , 112-N. Although just one resource is depicted in each compute node, it is noted that a compute node can include multiple resources, such as any or some combination of storage resources, processing resources, network resources, software resources, and so forth.

In the ensuing discussion, it is assumed that each resource 112-1, 112-2, . . . , 112-N includes a cache memory of the respective compute node.

A cache memory can be used to store data that has been retrieved from the storage infrastructure 110, and more specifically, from storage devices 114 of the storage infrastructure 110. The storage devices 114 have lower access speeds than the cache memory. Thus, if an I/O operation, such as a read operation, can be satisfied from a cache memory 112-1, 112-2, or 112-N, then the I/O operation can complete more quickly than if the I/O operation has to access data from a storage device 114.

In some examples, a cache memory can be implemented using a relatively fast memory device (or memory devices). As examples, the memory device(s) for the cache memory can include a dynamic random access memory (DRAM) device, a static random access memory (SRAM) device, and so forth.

The storage devices 114 can be implemented using flash-based storage devices. In such examples, the storage infrastructure 110 can be referred to as a JBOF storage. In other examples, the storage devices 114 can be implemented using disk-based storage devices or other types of storage devices.

The storage infrastructure 110 further includes a storage controller 116 that manages the access of data in the storage devices 114. The storage controller 116 is also connected to a memory 118 in the storage infrastructure 110, where the memory 118 can be implemented using a collection of memory devices (a single memory device or multiple memory devices).

The memory 118 can be a posted write memory in which write operations are posted by the storage controller 116 prior to completing the write operations to the storage devices 114. Posting a write operation to the memory 118 can refer to storing write data and write command information to the memory 118. Once a write operation has been posted to the memory 118, the storage controller 116 can return a write completion indication to the compute node 106-1, 106-2, or 106-N that issued the write operation to the storage infrastructure 110. This allows the write operation to complete more quickly than if the storage controller 116 were to wait for write data to be stored in a storage device 114 before a completion indication can be returned to the requester.

The control system 104 is used to derive various measures and models for use in making sizing and/or workload placement decisions according to some examples of the present disclosure. In FIG. 1, the control system 104 is separate from the storage system 102. In other examples, the control system 104 can be part of the storage system 102, and in some cases, can be implemented using any or some combination of the compute nodes 106-1 to 106-N.

More generally, the control system 104 can be implemented using a computer or multiple computers.

The control system 104 includes various modules, including a reuse distance histogram building engine 120, a statistics measure computing engine 122, a performance model building engine 124, a placement engine 126, a sizing engine 128, and an I/O sampling engine 130.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

Reuse Distance Histogram

The reuse distance histogram building engine 120 is used to build a reuse distance histogram. As explained above, a reuse distance is defined as a quantity of intervening unique accesses of data units before a given data unit is accessed again.

Figures 2, 3A, 3B:
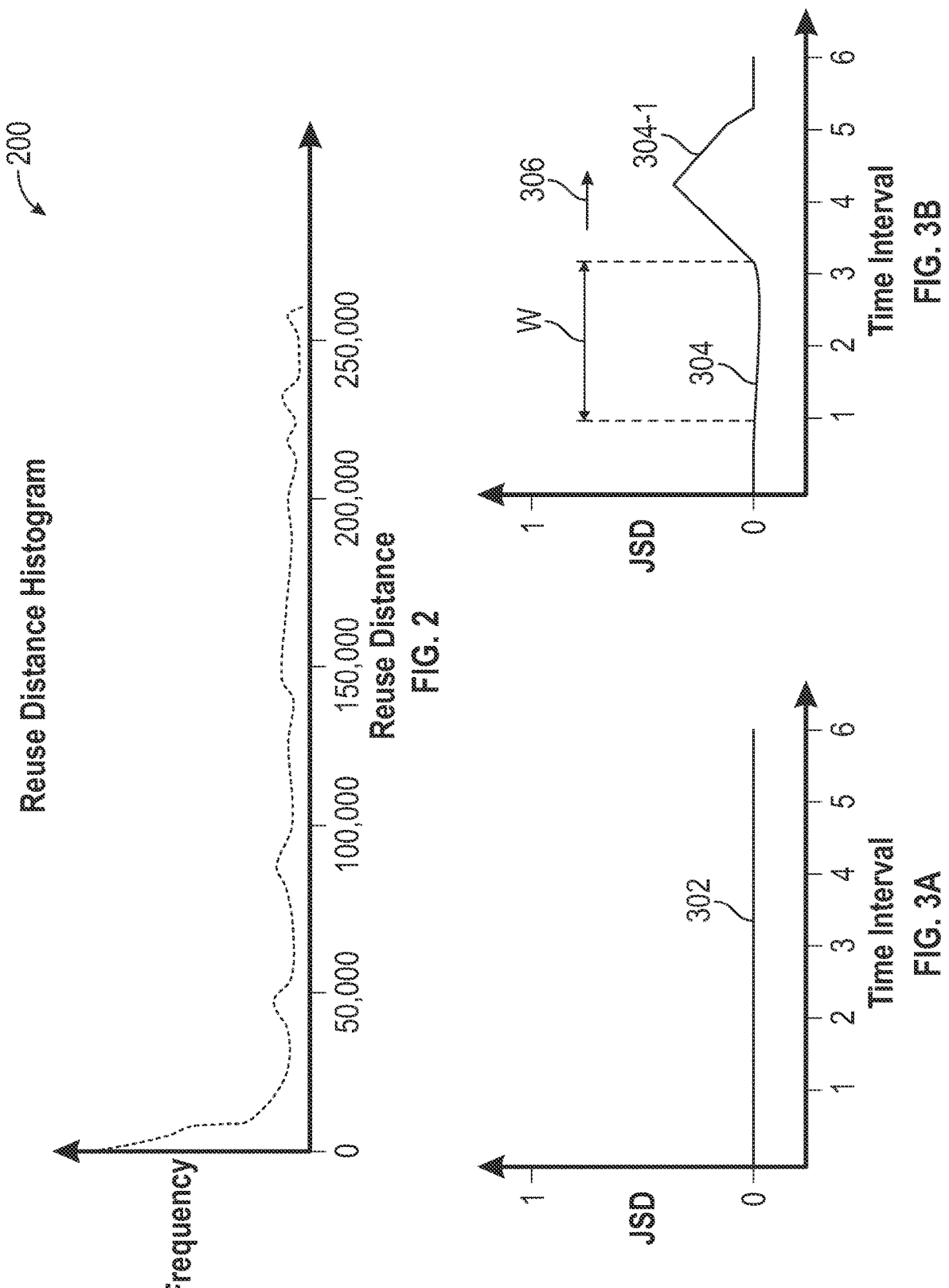
FIG. 2 is a graph of a reuse distance histogram, according to some examples.
FIGS. 3A and 3B are graphs illustrating values of a divergence measure as a function of time intervals, according to some examples.

FIG. 2 is a graph of an example reuse distance histogram 200. The horizontal axis represents reuse distance, and the vertical axis represents frequency of occurrence of each respective reuse distance (represented by dots in FIG. 2). Each dot in FIG. 2 represents the frequency of occurrence (e.g., quantity) of the respective reuse distance in I/O operations of a collection of workloads (a single workload or multiple workloads) for which the reuse distance histogram 200 is derived. The reuse distance histogram 200 is an example of a reuse distance distribution that represents, for each reuse distance, how many occurrences of the reuse distance was detected in the collection of workloads.

To reduce processing load, instead of deriving the reuse distance histogram 200 based on all I/O operations of a collection of workloads, the reuse distance histogram 200 can be based on sampled I/O operations of the collection of workloads. The sampled I/O operations include a subset of the I/O operations in the collection of workloads, where a "subset" refers to a portion that is less than an entirety. For example, the sampled I/O operations can include Y % of all of the I/O operations in the collection of workloads, where Y can be 10, 5, 1, 0.5, 0.1, and so forth.

In some examples, the sampling of I/O operations of the collection of workloads is performed by the I/O sampling engine 130. The sampling performed by the I/O sampling engine 130 can include random sampling in which I/O operations are sampled in a random manner. As an example, for each storage location L, the decision of whether or not to sample an I/O operation accessing L is based on whether hash(L) satisfies a specified condition, e.g., hash(L) mod P<T, where the effective sampling rate is R=T/P. Further details regarding such sampling are provided in Carl A. Waldspurger et al., "Efficient MRC Construction with SHARDS," 13$^{th}$ USENIX Conference on File and Storage Technologies (FAST '15), pp. 95-110, February 2015.

In other examples, the I/O sampling engine 130 can use another sampling algorithm.

The sampled I/O operations are provided by the I/O sampling engine 130 to the reuse distance histogram building engine 120, which can build a reuse distance histogram (e.g., 200) based on the sampled I/O operations.

In some examples, the reuse distance histogram building engine 120 can build a reuse distance histogram for each time interval of multiple time intervals, such that there are multiple reuse distance histograms for the respective multiple time intervals (e.g., a first reuse distance histogram for a first time interval, a second reuse distance histogram for a second time interval, etc.).

Statistics Measures

The statistics measure computing engine 122 of the control system 104 is able to derive statistic measures based on reuse distance histograms for respective time intervals. Generally, the statistics measure computing engine 122 can compute a statistics measure that represents a similarity between reuse distance histograms for different time intervals. Such a statistics measure can be referred to as a "similarity measure."

In some examples, the statistics measure computing engine 122 can normalize each reuse distance histogram into a respective probability distribution. The normalizing can be performed as follows. Each frequency value in the reuse distance histogram is divided by the total quantity of samples represented by the reuse distance histogram to obtain a respective probability. As an example, assume that the I/O sampling engine 130 collected 100 samples, of which 5 samples were observed to have a reuse distance equal to 20. If X is the random variable representing the reuse distance, then $P(X=20)$ is equal to 0.05, where $P(\ )$ is a probability function to compute a probability. The above is repeated for each different reuse distance to compute the probabilities of the probability distribution for the respective reuse distance histogram.

The reuse distance histograms for the different time intervals are normalized to respective probability distributions. A similarity measure that represents a similarity between reuse distance histogram A and reuse histogram B can be computed based on probability distribution A derived from reuse distance histogram A, and probability distribution B derived from reuse distance histogram B.

In some examples, the similarity measure computed by the statistics measure computing engine 122 is a Jensen-Shannon Divergence (JSD) measure. For each interval T, a JSD measure is computed based on probability distributions P, Q for time intervals T−1 and T. The JSD for probability distribution P (for time interval T−1) and probability distribution Q (for time interval T) is a bounded value between [0, 1] that indicates the similarity between P and Q. If JSD is close to 0, then P and Q are similar. On the other hand, if JSD is close to 1, then P and Q are dissimilar.

When the access locality of the workload remains relatively constant, the JSD values computed for different time intervals based on corresponding probability distributions of reuse distance histograms can be relatively uniform in value, as represented by a curve 302 in FIG. 3A that plots the relationship between JSD values as a function of time intervals.

However, if a change in the access locality of the workload occurs, then there may be a spike in the JSD values, as represented by a curve 304 in FIG. 3B. FIG. 3B shows that a spike 304-1 in JSD values occurs starting at time interval 3 and ending at time interval 5. The spike 304-1 in JSD values indicates a change in an I/O access pattern of the workload, or more specifically, a change in the access locality of the workload.

Placement Decision

In some examples, the placement engine 126 can detect the spike 304-1 in JSD values, or more generally, a change in the JSD values that satisfies a specified condition. In response to detecting the change in the JSD values that satisfies the specified condition, the placement engine 126 can initiate a workload placement process in which the placement engine 126 makes a determination whether the workload should be moved from a current compute node to another compute node. This placement determination can be based on various factors as discussed further below.

Figure 4:
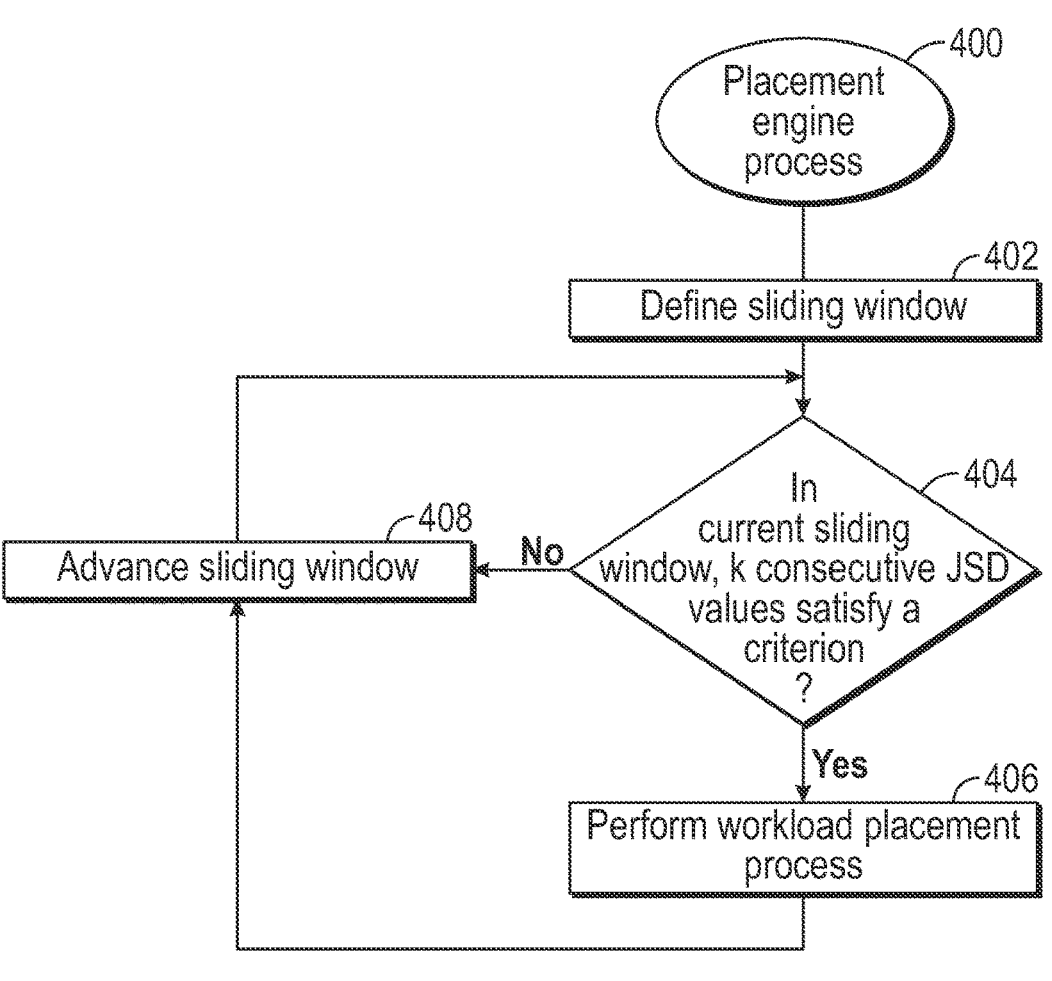
FIG. 4 is a flow diagram of a placement engine process, according to some examples.

FIG. 4 shows a placement engine process 400 that can be performed by the placement engine 126. In some examples, the placement engine 126 can define (at 402) a sliding window W (as shown in FIG. 3B). In the example of FIG. 3B, the sliding window W has a width of two time intervals, although in other examples, the sliding window W can have a different width. The placement engine 126 can incrementally advance (in the direction 306) over the time intervals. The sliding window W can be advanced by the In some examples, similarity values (e.g., JSD values) in the sliding window W can be advanced by the placement engine 126 by m (m≥1) time intervals as additional I/O samples are received over time.

The placement engine 126 can monitor the JSD values in the current sliding window W. The placement engine 126 determines (at 404) whether k (k≥1) consecutive JSD values satisfy a criterion. In some examples, placement engine 126 determines whether k consecutive JSD values in the current sliding window W exceed s (s≥1) standard deviations of an exponentially smoothed average of JSD values computed so far.

If the placement engine 126 determines that k consecutive JSD values satisfy the criterion, then the placement engine 126 performs (at 406) a workload placement process to determine whether to move the workload to another compute node.

If the placement engine 126 determines that k consecutive JSD values do not satisfy the criterion, then the placement engine 126 proceeds to task 408, in which the placement engine 126 advances the sliding window W by m time intervals, such as in response to a passage of an amount of time that is greater than or equal to the m time intervals.

After the placement engine 126 performs (at 406) the workload placement process, the placement engine 126 proceeds to task 408 to advance the sliding window W.

Approximate JSD Computation

Computation of JSD values involves floating-point arithmetic and log calculation over the probability distributions for the reuse distance histograms. The floating-point arithmetic and log calculation can be intensive in terms of usage of processing resources. If the JSD values cannot be computed in a timely manner by the control system 104, then workload change detection and placement decisions cannot be made in a timely fashion to support real time (online) processes by the placement engine 126.

In further examples, the statistics measure computing engine 122 can compute JSD values without use of probability distributions derived by normalizing reuse distance histograms.

To reduce the overhead associated with computing JSD values, the statistics measure computing engine 122 can made implement the following techniques: (1) the reuse distance histogram building engine 120 derives each reuse distance histogram for each respective time interval T based on the exact same quantity of sampled I/O operations, and (2) compute log values using a memoization technique.

Technique (1) allows the statistics measure computing engine 122 to skip the normalization task to convert a reuse distance histogram into a probability distribution. As a result, since probabilities do not have to be computed by dividing frequency values of the reuse distance histogram by the total quantity of samples, the statistics measure computing engine 122 can apply integer arithmetic to compute JSD values.

In some examples, a JSD value based on a first reuse distance histogram (P) and a second reuse distance histogram (Q) can be computed as follows:

$$JSD(P\|Q) = \frac{1}{2}D(P\|M) + \frac{1}{2}D(Q\|M),$$

where $$M = \frac{1}{2}(P + Q).$$

In some examples, D(P‖M) and D(Q‖M) are Kullback-Leibler divergences computed as follows:

$$D(A\|B) = \sum_x A(x) \log\left(\frac{A(x)}{B(x)}\right).$$

The computation of the log values to derive JSD values can be computed by using the relationship that log $$\left(\frac{A(x)}{B(x)}\right)$$

can be derived with the following computation: log(A(x))−log(B(x)). Thus, instead of calculating a log of $$\frac{A(x)}{B(x)},$$

which is a real number, the log can be computed as a difference of the log of integer numbers A(x) and B(x). Further, log(A(x)) and log(B(x) can each be computed using the memoization technique based on the recurrence: $\log_2$ (y)=1+$\log_2$(y/2). The value y is reduced to a small number by repeating the recurrence, until the value is reduced to less than a specified threshold.

Then, $\log_2(y)$ where y is less than the specified threshold can be derived by performing a simple lookup of an in-memory lookup table that stores log values for the first L integers, where L can be 10,000 or some other value. The in-memory lookup table is stored in a memory of the control system 104, and can be quickly accessed by the statistics measure computing engine 122.

As an example, to calculate log(1000000), using the above recurrence, the statistics measure computing engine 122 reduces log(1000000)=7+log(7812). The statistics measure computing engine 122 can look up the value of log (7812) from the in-memory lookup table, and add the value to 7 to derive log(1000000). Thus, log values can be computed by applying integer arithmetic to derive integers, and using the integers to look up values in the in-memory lookup table.

Performance Model

The performance model building engine 124 can build a performance model based on access locality measures, such as those included in reuse distance histograms.

From the reuse distance histogram for a given workload, the performance model building engine 124 can compute a Miss Ratio Curve (MRC) that plots an expected cache miss ratio as a function of a cache size. The cache miss ratio is a percentage value that represents a ratio of the quantity of cache misses over all I/O accesses. The computation of the MRC assumes an example in which the resources 112-1 to 112-N in the compute nodes 106-1 to 106-N are cache memories. The relation between the reuse distance and MRC is based on the observation that for a cache size equal to X, accesses with reuse distance greater than X would result in cache misses for the workload.

The performance model building engine 124 can build an MRC-based performance model that relates a performance measure with respect to a required cache size. In some examples, the performance measure is a relative IOPS measure, which is expressed as:

$$\frac{IOPS_r}{IOPS_{max}},$$

where $IOPS_r$ represents the IOPS assuming a cache miss rate of r, and $IOPS_{max}$ represents the IOPS assuming a cache miss rate of 0 (i.e., no cache misses).

An MRC-based performance model where the performance measure is the relative IOPS measure is referred to as an MRC-based IOPS model.

It is assumed that a storage (e.g., including the storage devices 114 of FIG. 1) has a storage access latency of $L_d$, which represents the latency associated with accessing data from the storage. A memory access latency is represented as $L_m$, which is the latency associated with accessing data from a cache memory in a compute node 106-1, 106-2, or 106-N.

A cache miss penalty M is equal to the ratio $L_d/L_c$. The cache miss penalty M indicates the increase in latency due to a miss in the cache memory that results in an access of data from the storage. Note that the term "data" can refer to metadata or actual data (e.g., user data, program data, etc.). In some examples, the cache memory can store metadata that is used to locate actual data.

Let r denote the cache miss rate for a workload. An average internal latency for a single I/O operation is equal to $L_c*(1+r*M))$, where M is a specified value. The average internal latency is the latency for accessing metadata, either from the cache memory or from the storage.

Figure 5:
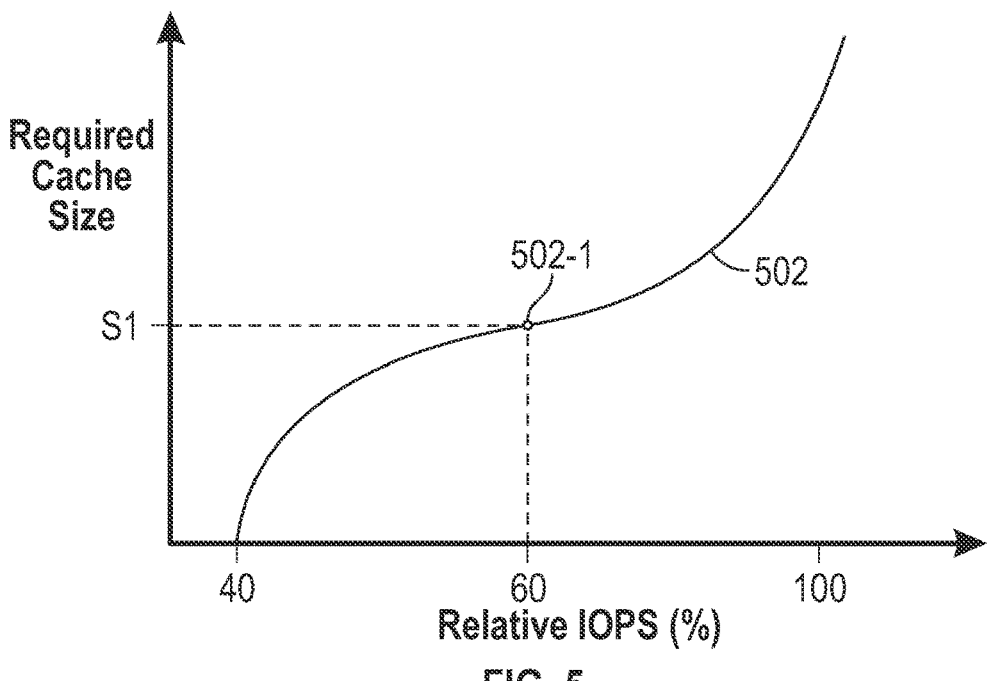
FIG. 5 is a graph that illustrates a relationship between a performance measure and a resource parameter, according to some examples.

An average external latency depends on the use of caching in a storage architecture. The average external latency is the latency for an I/O operation to access actual data that involves first accessing metadata that is then used to determine a storage location of the actual data. In an example, the storage architecture may employ two levels of metadata that are to be accessed to determine a location of actual data. Both levels of metadata can be cached in memory and looked up for external data reads. For such a storage architecture, the average external latency (e.g., for an external data read) is expressed as $L_c*(2+M*(1+2*r))$, not including a near-constant network latency. Let $IOPS_r$ denote the read performance for the workload at cache miss rate r. The maximum performance $IOPS_{max}$ at (r=0) would have average latency of $(L_c*(2+M))$. The ratio $$\frac{IOPS_r}{IOPS_{max}}$$

denotes the degradation in read performance equal to (2+M)/ (2+M*(1+2*r)). Assuming a fixed value of M=5, and plugging in values for r from the workload's MRC, the performance model building engine 124 can obtain an IOPS degradation curve 502 as shown in FIG. 5. The IOPS degradation curve 502 is an example of the MRC-based IOPS model discussed above.

In the graph of FIG. 5, the horizontal axis represents relative IOPS, which is the degradation in performance (expressed as a percentage value) that an entity (e.g., an enterprise, a user, a program, a machine, etc.) is willing to accept. The vertical axis represents a required cache size, which is the minimum size of the cache memory to achieve the corresponding relative IOPS as represented by a curve 502.

The curve 502 relates different required cache sizes to different relative IOPS values. For example, if the entity is willing to accept a relative IOPS of 60% (a degradation of 40% from the maximum performance where the cache miss rate r is 0), which corresponds to a point 502-1 on the curve 502, then the corresponding required cache size is S1, which means that the cache memory has to be configured to have at least the size S1 to achieve a relative IOPS of at least 60%.

In some examples, the placement engine 126 can use the MRC-based IOPS model (e.g., the curve 502) to make a workload placement decision. When a workload placement process is triggered, as depicted in FIG. 4, the placement engine 126 can retrieve information of the cache sizes of the cache memories in the compute nodes 106-1 to 106-N. The information of the cache sizes may be stored in a configuration database, for example.

The workload placement process can compare the cache sizes of the cache memories in the compute nodes 106-1 to 106-N, and can determine a target relative IOPS for the workload. The target relative IOPS for the workload may be set by an administrator or another entity. Then, given the target relative IOPS, the workload placement process can identify the compute nodes with cache sizes sufficient to meet the target relative IOPS, based on the MRC-based IOPS model.

The workload placement process can then select one of the compute nodes with sufficient cache sizes to place the workload. If the selected compute node is different from a compute node in which the workload is currently executing, then the workload placement process can migrate the workload to the selected compute node. Note that the selection of a compute node to place the workload can also depend on further factors, such as how busy each compute node is (e.g., based on consumption of processing, storage, or network resources). The workload placement process may favor the selection of a compute node with sufficient cache size that is less busy.

Sizing Process

In some examples, a performance model (such as the MRC-based IOPS model discussed above, represented by the example curve 502 shown in FIG. 5) can be used by the sizing engine 128 to perform sizing of the resource 112-1 to 112-N (e.g., a cache memory) in each compute node 106-1 to 106-N.

"Sizing" a resource can refer to setting a capacity of the resource in a compute node, such as setting a size of a cache memory, setting an operating speed of a processing resource, setting a communication speed of a network resource, and so forth.

In some examples, a cache memory in a compute node may used for different purposes, including purposes other than to store metadata associated with data in the storage infrastructure 110. A portion of the cache memory may be allocated to store metadata associated with data in the storage infrastructure 110. The size of this allocated portion may be dynamically adjusted by the sizing engine 128 as part of sizing process.

The sizing engine 128 can consider the MRC-based IOPS model (e.g., the curve 502) to determine what an appropriate size of the allocated portion of the cache memory should be given a target relative IOPS that is acceptable.

Example Implementations

Figure 6:
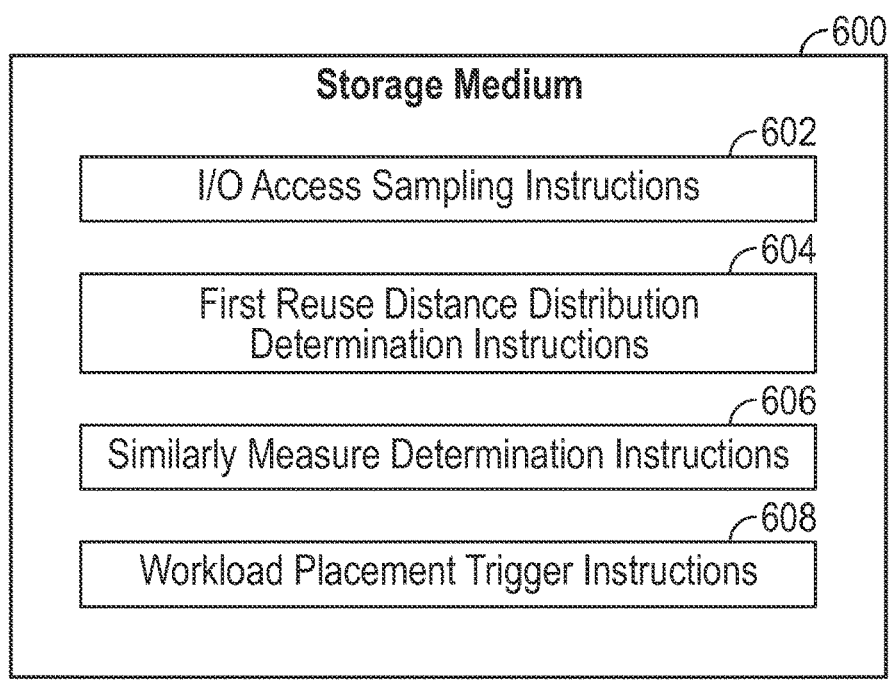
FIG. 6 is a block diagram of a storage medium storing machine-readable instructions according to some examples.

FIG. 6 is a block diagram of a non-transitory machine-readable or computer-readable storage medium 600 storing machine-readable instructions that upon execution cause a system to perform various tasks. The system can include a computer or multiple computers.

The machine-readable instructions include I/O access sampling instructions 602 (which may be part of the I/O sampling engine 130, for example) to sample a subset of I/O accesses of a storage (e.g., the storage infrastructure 110). The I/O accesses are part of a workload.

The machine-readable instructions include first reuse distance distribution determination instructions 604 to determine, based on the sampled subset of the I/O accesses, a first reuse distance distribution for a first time interval, the first reuse distance distribution representing an access locality of the workload.

The machine-readable instructions include similarity measure determination instructions 606 to determine a similarity measure representing a similarity of the first reuse distance distribution and a second reuse distance distribution for a second time interval different from the first time interval.

In some examples, the first distribution and the second distribution are each based on an identical quantity of sampled I/O accesses of the storage.

In some examples, the similarity measure determination instructions 606 determine the similarity measure based on applying an integer arithmetic to compute integers, and perform lookups of an in-memory table that maps the integers to floating point values.

In some examples, the similarity measure includes a divergence measure, such as a Jensen-Shannon Divergence (JSD) measure.

The machine-readable instructions include workload placement trigger instructions 608 to, based on a change in the similarity measure, trigger a workload placement process to determine a placement of the workload on a compute node of a plurality of compute nodes that are able to access the storage.

In some examples, the workload placement trigger instructions 608 determine whether the change in the similarity measure satisfies a criterion, and trigger the workload placement process in response to determining that the change in the similarity measure satisfies the criterion.

In some examples, the similarity measure is a first similarity measure, and the workload placement trigger instructions 608 determine that the change in the first similarity measure satisfies the criterion responsive to the first similarity measure and a second similarity measure satisfying an aggregate criterion, e.g., k consecutive similarity values in a sliding window (e.g., W in FIG. 5) exceeding s standard deviations of an aggregate (e.g., average) of similarity measure values.

In some examples, the machine-readable instructions can further derive a resource utility relationship based on the first reuse distance distribution, the resource utility relationship relating resource capacities of a resource to a performance measure. The resource utility relationship can form a performance model, for example (e.g., the curve 502 in FIG. 5).

In some examples, the placement of the workload on the compute node of a plurality of compute nodes provided by the workload placement process is based on the resource utility relationship and respective resource capacities of the plurality of compute nodes.

In some examples, the resource is selected from among a cache memory, a processor, and a network.

Figure 7:
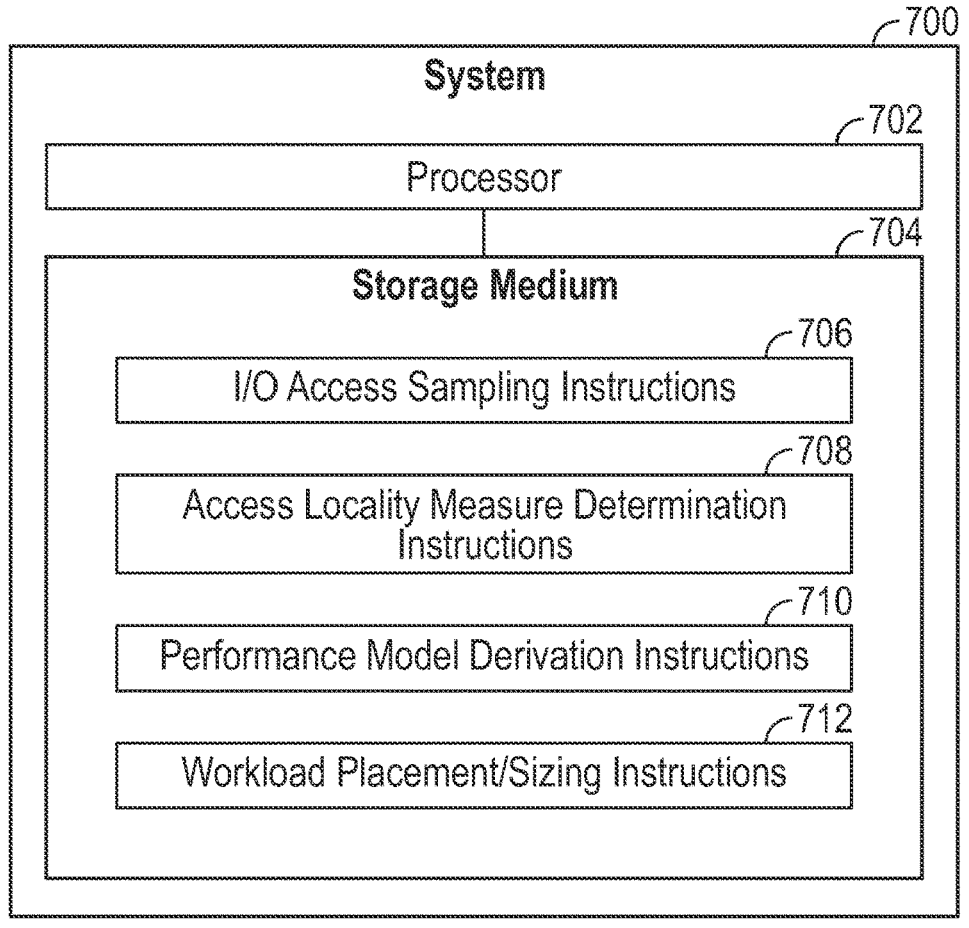
FIG. 7 is a block diagram of a system according to some examples.

FIG. 7 is a block diagram of a system 700 according to some examples. The system 700 can be implemented using a computer or multiple computers.

The system 700 includes a processor 702 (or multiple processors). A processor, or more specifically a hardware processor, can include a microprocessor, a core of a multi-core microprocessor, a microcontroller, a programmable integrated circuit, a programmable gate array, or another hardware processing circuit.

The system 700 includes a storage medium 704 storing machine-readable instructions executable on the processor 702 to perform various tasks. Machine-readable instructions executable on a processor can refer to the instructions executable on a single processor or the instructions executable on multiple processors.

The machine-readable instructions in the storage medium 704 can include I/O access sampling instructions 706 to sample a subset of I/O accesses of a storage, the I/O accesses being part of a workload.

The machine-readable instructions in the storage medium 704 can include access locality measure determination instructions 708 to determine an access locality measure based on the sampled subset of the I/O accesses, the access locality measure representing a property of the workload, and the access locality measure representing a distance relating to accesses of data units by the I/O accesses.

The machine-readable instructions in the storage medium 704 can include performance model derivation instructions 710 to derive a performance model that predicts performance as a function of a resource capacity.

In some examples, the performance model relates a degradation in performance as a function of the resource capacity.

The machine-readable instructions in the storage medium 704 can include workload placement/sizing instructions 712 to, based on the performance model, perform one or more of placing the workload on a compute node of a plurality of compute nodes, or setting the resource capacity of a resource in the compute node.

Figure 8:
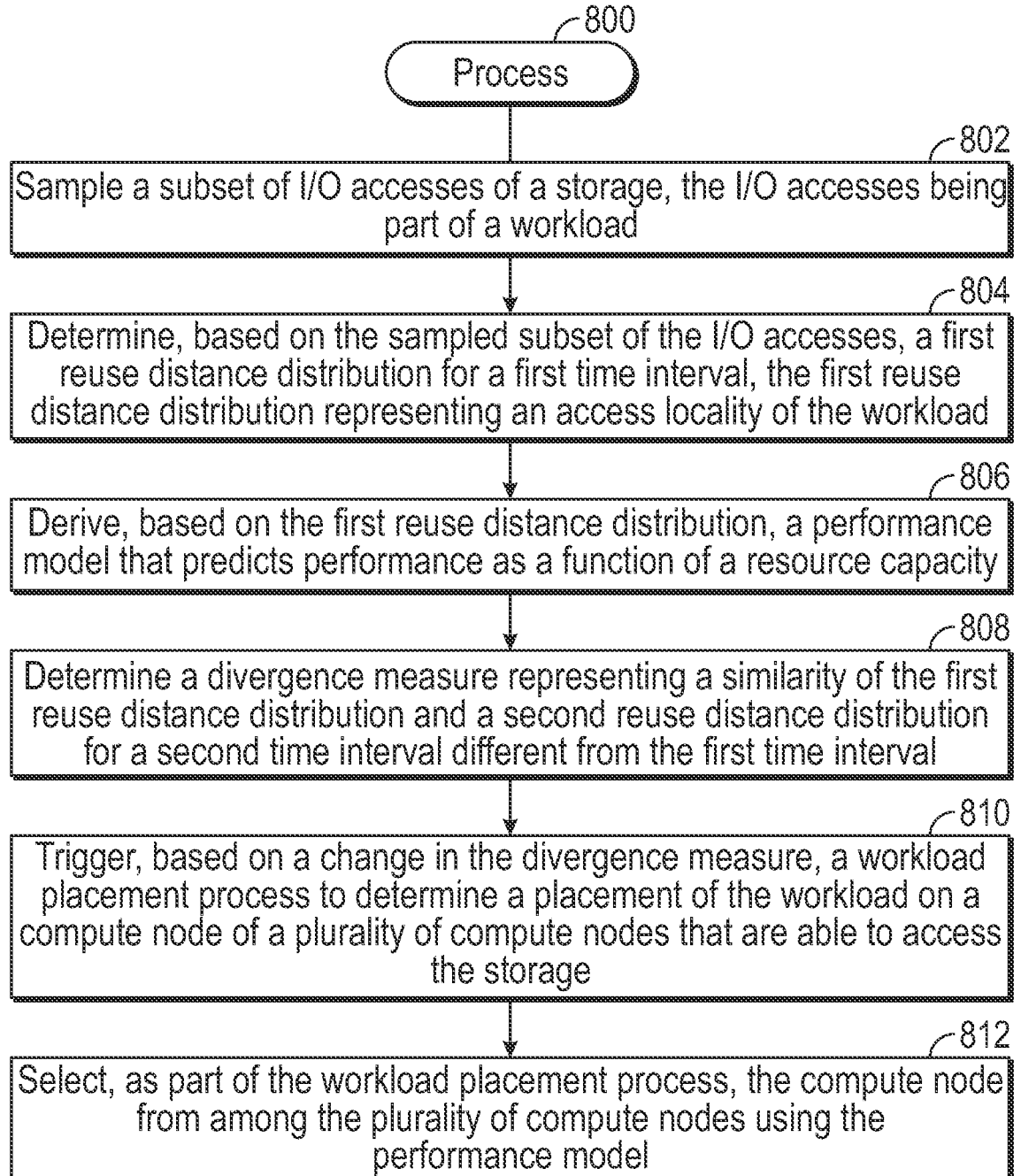
FIG. 8 is a flow diagram of a process according to some examples.

FIG. 8 is a flow diagram of a process 800 according to some examples, which can be performed by the control system 104 of FIG. 1, for example.

The process 800 includes sampling (at 802) a subset of I/O accesses of a storage, the I/O accesses being part of a workload.

The process 800 includes determining (at 804), based on the sampled subset of the I/O accesses, a first reuse distance distribution for a first time interval, the first reuse distance distribution representing an access locality of the workload. For example, the first reuse distance distribution can include a first reuse distance histogram, or a probability distribution based on the first reuse distance histogram.

The process 800 includes deriving (at 806), based on the first reuse distance distribution, a performance model that predicts performance as a function of a resource capacity. The performance model can be an MRC-based IOPS model, for example.

The process 800 includes determining (at 808) a divergence measure representing a similarity of the first reuse distance distribution and a second reuse distance distribution for a second time interval different from the first time interval. The divergence measure can be a JSD measure, for example.

The process 800 includes triggering (at 810), based on a change in the divergence measure, a workload placement process to determine a placement of the workload on a compute node of a plurality of compute nodes that are able to access the storage.

The process 800 includes selecting (at 812), as part of the workload placement process, the compute node from among the plurality of compute nodes using the performance model.

A storage medium (e.g., 600 in FIG. 6 or 704 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EE-PROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

sample a subset of input/output (I/O) accesses of a storage, the I/O accesses being part of a workload;

determine, based on the sampled subset of the I/O accesses, a first reuse distance distribution for a first time interval, the first reuse distance distribution representing an access locality of the workload, the first reuse distance distribution comprising a value representing a quantity of intervening data units accessed between accesses of a given data unit;

determine a similarity measure representing a similarity of the first reuse distance distribution and a second reuse distance distribution for a second time interval different from the first time interval, the second reuse distance distribution comprising a value representing a quantity of intervening data units accessed between accesses of the given data unit;

determine whether a change in the similarity measure satisfies a criterion; and based on a determining that the change in the similarity measure satisfies the criterion, trigger a workload placement process comprising moving the workload from a first compute node of a plurality of compute nodes that are able to access the storage to a second compute node of the plurality of compute nodes.

2. The non-transitory machine-readable storage medium of claim 1, wherein the similarity measure is a first similarity measure, and the instructions upon execution cause the system to:

determine that the change in the first similarity measure satisfies the criterion responsive to the first similarity measure and a second similarity measure satisfying an aggregate criterion.

3. The non-transitory machine-readable storage medium of claim 2, wherein the first and second similarity measures are part of a collection of similarity measures.

4. The non-transitory machine-readable storage medium of claim 3, wherein the instructions upon execution cause the system to:

determine that the change in the first similarity measure satisfies the criterion responsive to a quantity of consecutive similarity measures in the collection of similarity measures deviating by a specified amount from an aggregate of the similarity measures in the collection of similarity measures.

5. The non-transitory machine-readable storage medium of claim 4, wherein the aggregate of the similarity measures in the collection of similarity measures is an average of the similarity measures in the collection of similarity measures.

6. The non-transitory machine-readable storage medium of claim 4, wherein the specified amount is a specified number of standard deviations of the aggregate.

7. The non-transitory machine-readable storage medium of claim 1, wherein the instructions upon execution cause the system to:

derive a first probability distribution based on the first reuse distance distribution;

derive a second probability distribution based on the second reuse distance distribution, wherein the similarity measure is determined based on the first probability distribution and the second probability distribution.

8. The non-transitory machine-readable storage medium of claim 1, wherein the instructions upon execution cause the system to:

determine the similarity measure based on:

applying an integer arithmetic to compute integers, and performing lookups of an in-memory table that maps the integers to floating point values.

9. The non-transitory machine-readable storage medium of claim 8, wherein the similarity measure comprises a divergence measure.

10. The non-transitory machine-readable storage medium of claim 9, wherein the divergence measure comprises a Jensen-Shannon Divergence (JSD) measure.

11. The non-transitory machine-readable storage medium of claim 1, wherein the instructions upon execution cause the system to:

derive a resource utility relationship based on the first reuse distance distribution, the resource utility relationship relating resource capacities of a resource to a performance measure.

12. The non-transitory machine-readable storage medium of claim 11, wherein the moving of the workload to the second compute node provided by the workload placement process is based on the resource utility relationship and respective resource capacities of the plurality of compute nodes.

13. The non-transitory machine-readable storage medium of claim 12, wherein the resource is selected from among a cache memory, a processor, and a network.

14. A system comprising:

a processor; and a non-transitory storage medium storing instructions executable on the processor to:

sample a subset of input/output (I/O) accesses of a storage, the I/O accesses being part of a workload;

determine a first reuse distance distribution for a first time interval based on the sampled subset of the I/O accesses, the first reuse distance distribution representing an access locality of the workload, and the first reuse distance distribution comprising reuse distances, wherein a reuse distance of the reuse distances is a value representing a quantity of intervening data units accessed between accesses of a given data unit;

determine a similarity measure representing a similarity of the first reuse distance distribution and a second reuse distance distribution for a second time interval different from the first time interval, the second reuse distance distribution comprising reuse distances, wherein a reuse distance of the reuse distances in the second reuse distance distribution is a value representing a quantity of intervening data units accessed between accesses of the given data unit;

derive, based on the first reuse distance distribution, a performance model that represents a degradation in performance as a function of a resource capacity; and based on a change in the similarity measure satisfying a criterion and the performance model, perform a workload placement process comprising moving the workload from a first compute node of a plurality of compute nodes that are able to access the storage to a second compute node of the plurality of compute nodes.

15. The system of claim 14, wherein the performance model represents the degradation in performance as a function of a size of a cache memory.

16. The system of claim 15, wherein the workload placement process comprises selecting the second compute node based on sizes of cache memories in the plurality of compute nodes.

17. A method performed by a system comprising a hardware processor, comprising:

sample a subset of input/output (I/O) accesses of a storage, the I/O accesses being part of a workload;

determine, based on the sampled subset of the I/O accesses, a first reuse distance distribution for a first time interval, the first reuse distance distribution representing an access locality of the workload;

derive, based on the first reuse distance distribution, a performance model that predicts performance as a function of a resource capacity;

determine a divergence measure representing a similarity of the first reuse distance distribution and a second reuse distance distribution for a second time interval different from the first time interval, wherein the divergence measure is determined based on:

applying an integer arithmetic to compute integers, and performing lookups of an in-memory table that maps the integers to floating point values that represent log values;

based on a change in the divergence measure, trigger a workload placement process comprising moving the workload from a first compute node of a plurality of compute nodes that are able to access the storage to a second compute node of the plurality of compute nodes; and as part of the workload placement process, select the second compute node from among the plurality of compute nodes using the performance model.

18. The method of claim 17, wherein the performance model represents a degradation in performance as a function of the resource capacity.

* * * * *